(12) United States Patent
Karlsson

(10) Patent No.: US 7,350,612 B2
(45) Date of Patent: Apr. 1, 2008

(54) SHOCK ABSORBING HYDRAULIC SYSTEM FOR ALL-TERRAIN LOAD-CARRYING VEHICLE, AND ALL TERRAIN LOAD-CARRYING VEHICLE INCLUDING SUCH A HYDRAULIC SYSTEM

(75) Inventor: Einar Karlsson, Burträsk (SE)

(73) Assignee: Hultdin System AB, Mala (SE)

( * ) Notice: Subject to any disclaimer, the term of this patent is extended or adjusted under 35 U.S.C. 154(b) by 477 days.

(21) Appl. No.: 10/526,146

(22) PCT Filed: Aug. 26, 2003

(86) PCT No.: PCT/SE03/01311

§ 371 (c)(1),
(2), (4) Date: Mar. 1, 2005

(87) PCT Pub. No.: WO2004/020229

PCT Pub. Date: Mar. 11, 2004

(65) Prior Publication Data

US 2005/0230888 A1    Oct. 20, 2005

(30) Foreign Application Priority Data

Sep. 2, 2002 (SE) .................................. 0202580

(51) Int. Cl.
*B62D 33/00* (2006.01)
(52) U.S. Cl. ............... 180/89.13; 267/186; 296/190.07
(58) Field of Classification Search ............. 180/89.13, 180/89.14, 89.15, 89.16; 280/124.157, 124.16, 280/124.161; 296/190.04, 190.07; 267/186, 267/217, 256
See application file for complete search history.

(56) References Cited

U.S. PATENT DOCUMENTS 4,606,551 A * 8/1986 Toti et al. ............. 280/124.161
5,139,104 A    8/1992 Moscicki
5,174,603 A   12/1992 Lund
5,447,332 A    9/1995 Heyring
5,794,966 A    8/1998 MacLeod (Continued)

FOREIGN PATENT DOCUMENTS

DE           43 24 289           1/1995

(Continued)

*Primary Examiner*—Eric Culbreth
(74) *Attorney, Agent, or Firm*—Nixon & Vanderhye P.C.

(57) ABSTRACT

A shock-absorbing hydraulic system for cushioning a structural part of an all-terrain load-carrying vehicle, said hydraulic system having a first, hydraulic front cylinder and a first, hydraulic rear cylinder (1, 2) being connected in series and being arranged on one side of the longitudinal axis of the load-carrying vehicle, and a second, hydraulic front cylinder and a second hydraulic, rear cylinder (3, 4) being connected in series and being arranged on the other side of the longitudinal axis of the load-carrying vehicle, wherein each of the hydraulic cylinders exhibits a first end (5) and a second end (6) and is arranged between the structural part and the chassis of the load-carrying vehicle. According to the invention, the first end of the first, hydraulic front cylinder is connected to the second end of the second, hydraulic rear cylinder, and the second end of the first, hydraulic rear cylinder is connected to the first end of the second, hydraulic front cylinder. The invention also relates to an all-terrain load-carrying vehicle including such a hydraulic system.

12 Claims, 2 Drawing Sheets

U.S. PATENT DOCUMENTS 5,915,701 A 6/1999 Heyring

FOREIGN PATENT DOCUMENTS

| | | | | |
|---|---|---|---|---|
| EP | 0 495 442 | | 7/1992 | |
| FR | 2633564 | * | 1/1990 | ................. 267/256 |
| GB | 890089 | | 2/1962 | |
| JP | 6-191444 | * | 7/1994 | ............ 296/190.07 |
| WO | WO 00/61394 | | 10/2000 | |

* cited by examiner

SHOCK ABSORBING HYDRAULIC SYSTEM FOR ALL-TERRAIN LOAD-CARRYING VEHICLE, AND ALL TERRAIN LOAD-CARRYING VEHICLE INCLUDING SUCH A HYDRAULIC SYSTEM

This application is the U.S. national phase of International PCT Application No. PCT/SE2003/001311, filed Aug. 26, 2003, which designated the United States. PCT/SE2003/001311 claims priority of Swedish Patent Application No. 0202580-7, filed Sep. 2, 2002. The entire contents of these applications are herein incorporated by reference.

The present invention relates to a shock-absorbing hydraulic system for cushioning a structural part of an all-terrain load-carrying vehicle, said hydraulic system including:

a first, double-acting, hydraulic front cylinder and a first, double-acting, hydraulic rear cylinder, each exhibiting a first end and a second end, said first hydraulic cylinders being connected in series by means of a first, series-connecting hydraulic conduit and being arranged on one side of the longitudinal axis of the load-carrying vehicle in a succession in the longitudinal direction of the load-carrying vehicle; and a second, double-acting, hydraulic front cylinder and a second, double-acting, hydraulic rear cylinder, each exhibiting a first end and a second end, said second hydraulic cylinders being connected in series by means of a second, series-connecting hydraulic conduit and being arranged on the other side of the longitudinal axis of the load-carrying vehicle in a succession in the longitudinal direction of the load-carrying vehicle, said hydraulic cylinders being arranged between the structural part and the chassis of the load-carrying vehicle.

The invention also relates to an all-terrain load-carrying vehicle including such a hydraulic system.

In an all-terrain load-carrying vehicle which is operated in rough terrain, for example a forwarder transporting round logs in forest terrain, there are structural parts which need to be cushioned. Examples of such structural parts are the operator's cabin of the vehicle and the load-carrying member of the vehicle. The task of the above-mentioned shock-absorbing system is to absorb shocks in a vertical direction and to suppress possible roll movements of the structural part in order to prevent excessive lateral movements of the structural part. As far as the operator's cabin of the vehicle is concerned, the cushioning is necessary in order to make the operator's cabin a tolerable working environment for the vehicle operator. As far as the load-carrying member is concerned, the cushioning is necessary in order to reduce the tipping tendency of the vehicle.

One problem when cushioning a structural part of an all-terrain load-carrying vehicle is to design a shock-absorbing system which provides an efficient cushioning in all terrain conditions, while maintaining the stability of the shock-absorbing system, i.e. without the structural part assuming an excessive inclination when the vehicle is operated in rough terrain. The operator's cabin of a forwarder, for instance, tends to assume an inclination which is larger than the one of the chassis of the forwarder when the forwarder is operated in a steep rise or downward slope, or slantwise. Furthermore, the cushioning capacity of conventional shock-absorbing hydraulic systems deteriorates when the vehicle is operated in such terrain.

It is true that it is possible to supplement a shock-absorbing hydraulic system with mechanical anti-roll members which stabilize the hydraulic system in uneven terrain. Such anti-roll members, however, have the disadvantage that they restrict the ability of the hydraulic system to cushion the two sides of the structural part independent of each other. Furthermore, such mechanical anti-roll members are bulky and heavy, which makes the centre of gravity of the load-carrying vehicle higher.

Trials have been performed with computer controlled hydraulic wheel suspensions, which are intended to ensure that the chassis of the all-terrain load-carrying vehicle is maintained horizontally while the wheel set or bogie is positively controlled. It has been found, however, that such positively controlled systems are slow and that they function in an unsatisfying way also at moderate vehicle speeds.

Accordingly, the object of the present invention is to provide a new shock-absorbing hydraulic system for cushioning a structural part of an all-terrain load-carrying vehicle, wherein said hydraulic system is simple and stable in rough terrain and which, in addition, exhibits excellent spring action in a vertical direction and excellent anti-roll capacity when the vehicle is operated in such terrain.

The hydraulic system and the all-terrain load-carrying vehicle according to the invention are characterised in that the first end of the first, hydraulic front cylinder is connected to the second end of the second, hydraulic rear cylinder by means of a first, diagonal hydraulic conduit, and in that the second end of the first, hydraulic rear cylinder is connected to the first end of the second, hydraulic front cylinder by means of a second, diagonal hydraulic conduit.

As used herein, "the first end of one hydraulic cylinder being connected to the second end of the other hydraulic cylinder" means that the piston end of one hydraulic cylinder is in hydraulic connection with the rod end of the other hydraulic cylinder, or vice versa.

In the following, the invention will be described closer with reference to the drawings.

Figure 1:
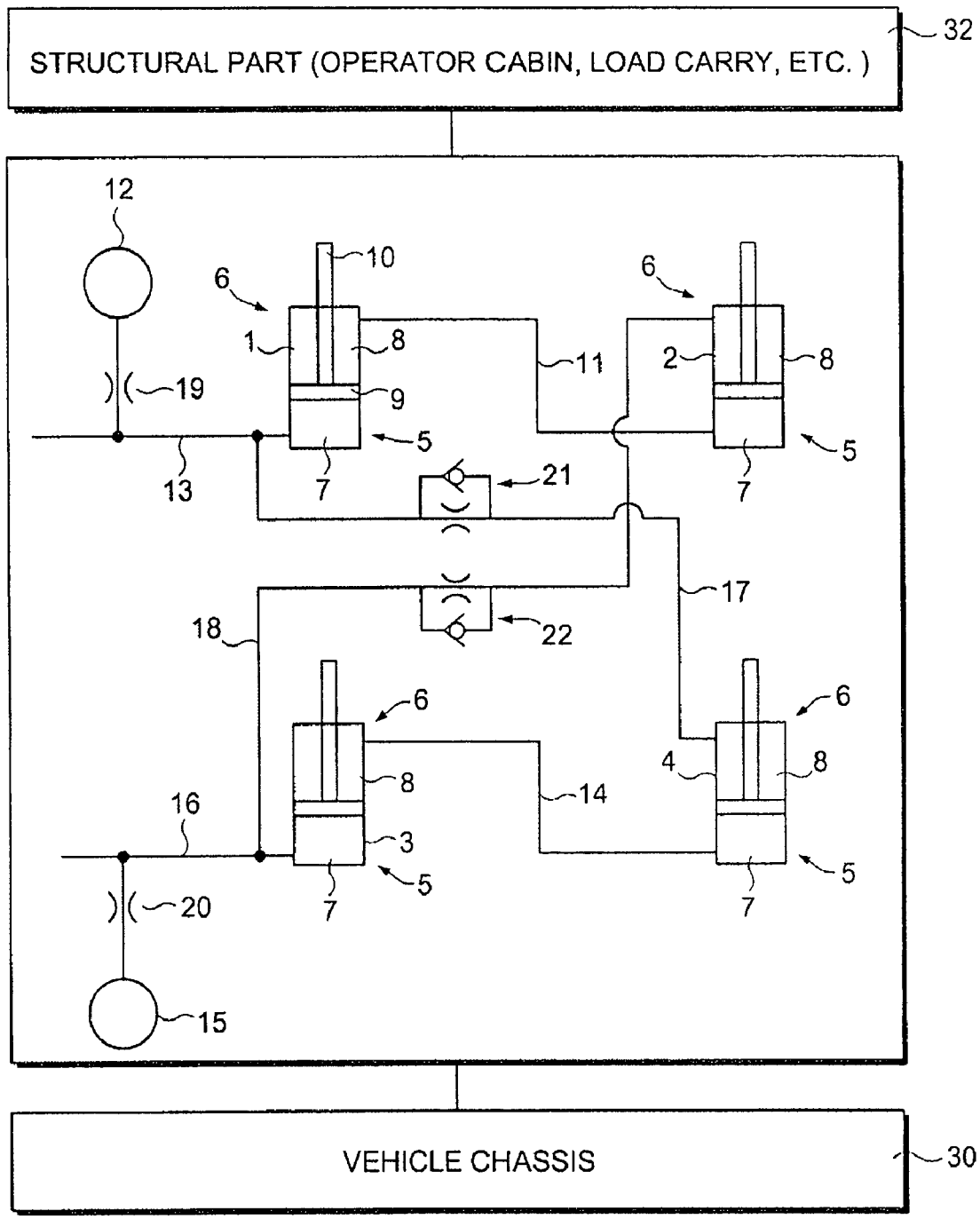
FIG. 1 is a schematic representation of a first embodiment of a hydraulic system according to the invention.

The hydraulic system in FIG. 1 includes four double-acting hydraulic cylinders 1, 2, 3, 4, which are arranged between a chassis 30 (shown schematically in FIG. 1) and a structural part 32, such as an operator's cabin or other load carrying member (shown schematically in FIG. 1), of a forwarder (not shown) in order to cushion the structural part 32 when the forwarder is operated in rough terrain. At its piston end 5, each hydraulic cylinder 1, 2, 3, 4 is attached to the chassis 30, and at its rod end 6 to the operator's cabin 32. At its piston end 5, each hydraulic cylinder 1, 2, 3, 4 has a first, lower hydraulic chamber 7 and at its rod end, a second, upper hydraulic chamber 8. The hydraulic chambers 7, 8 are separated by a hydraulic piston 9. The hydraulic piston 9 is attached to a piston rod 10, which in its turn is attached to the operator's cabin. The above-mentioned cushioning is obtained by means of bringing hydraulic fluid to flow into and out of the hydraulic chambers 7, 8 of the hydraulic cylinders 1, 2, 3, 4.

The hydraulic cylinders 1 and 2, which in the following will be denoted the first, or right-hand, hydraulic front cylinder 1 and the first, or right-hand, hydraulic rear cylinder 2, respectively, are arranged on the right-hand side of the longitudinal axis of the forwarder. In the longitudinal direction of the forwarder, the right-hand, hydraulic front cylinder 1 is arranged ahead of the right-hand, hydraulic rear cylinder 2. The hydraulic cylinders 3 and 4, which in the following will be denoted the second, or left-hand, hydraulic front cylinder 3 and the second, or left-hand, hydraulic rear cylinder 4, respectively, are arranged on the left-hand side of the longitudinal axis of the forwarder. In the longitudinal direction of the forwarder, the left-hand, hydraulic front cylinder 3 is arranged ahead of the left-hand, hydraulic rear cylinder 4. In the transversal direction of the forwarder, the hydraulic front cylinders 1, 3 preferably are placed opposite each other, as is also the case with the rear cylinders 2, 4.

The right-hand hydraulic cylinders 1 and 2 are connected in series with each other by means of a first, right-hand, series-connecting hydraulic conduit 11, which connects the upper hydraulic chamber 8 of the right-hand, hydraulic front cylinder 1 to the lower hydraulic chamber 7 of the right-hand, hydraulic rear cylinder 2. Furthermore, the right-hand, hydraulic front cylinder 1 is connected to a first storage tank 12 by means of a right-hand, connecting hydraulic conduit 13, which connects to the lower hydraulic chamber 7 of the right-hand, hydraulic front cylinder 1. In the same way, the left-hand hydraulic cylinders 3 and 4 are connected in series with each other by means of a second, left-hand, series-connecting hydraulic conduit 14 which connects the upper hydraulic chamber 8 of the left-hand, hydraulic front cylinder 3 to the lower hydraulic chamber 7 of the left-hand, hydraulic rear cylinder 4. The left-hand, hydraulic front cylinder 3 is connected to a second storage tank 15 by means of a left-hand, connecting hydraulic conduit 16 which connects to the lower hydraulic chamber 7 of the left-hand, hydraulic front cylinder 3.

The right-hand, hydraulic front cylinder 1 is connected to the left-hand, hydraulic rear cylinder 4 by means of a first, diagonal hydraulic conduit 17, which connects the lower hydraulic chamber 7 of the right-hand, hydraulic front cylinder 1 to the upper hydraulic chamber 8 of the left-hand, hydraulic rear cylinder 4. In the same way, the right-hand, hydraulic rear cylinder 2 is connected to the left-hand, hydraulic front cylinder 3 by means of a second, diagonal hydraulic conduit 18, which connects the upper hydraulic chamber 8 of the right-hand, hydraulic rear cylinder 2 to the lower hydraulic chamber 7 of the left-hand, hydraulic front cylinder 3. In other words, the piston end 5 of the right-hand, hydraulic front cylinder 1 is connected to the rod end 6 of the left-hand, hydraulic rear cylinder 4, and the rod end 6 of the right-hand, hydraulic rear cylinder 2 is connected to the piston end 5 of the left-hand, hydraulic front cylinder 3.

By means of connecting the right-hand hydraulic cylinders 1 and 2 to the left-hand hydraulic cylinders 3 and 4 in the above-described fashion, a shock-absorbing system which is stable and efficient also when the forwarder is operated in rough terrain is obtained. If, for example, the forwarder is operated in a left-hand downhill slope, in which case the right-hand, hydraulic front cylinder 1 is loaded more than the remaining hydraulic cylinders 2, 3, 4, the diagonal hydraulic conduits 17 and 18 allow a force exchange carried by hydraulic fluid between the right-hand, hydraulic front cylinder 1 and the left-hand, hydraulic rear cylinder 4, which ensures that the left-hand, hydraulic rear cylinder 4 does not raise. In this way, it is avoided that the operator's cabin, as a result of the slope of the hill, assumes an excessive inclination to the right. At the same time as an excessive inclination of the operator's cabin is prevented, the right-hand and left-hand side of the operator's cabin are allowed to spring substantially independent of each other by means of letting hydraulic fluid flow out of and into the storage tanks 12 and 15. Throttle valves 19, 20 at the storage tanks 12, 15 restrain the flow of hydraulic oil between the first storage tank 12 and the hydraulic cylinders 1 and 2, and between the second storage tank 15 and the hydraulic cylinders 3 and 4, respectively, and ensure that an appropriate quantity of hydraulic fluid can be exchanged between the storage tanks 12, 15 and the hydraulic cylinders 1, 2, 3, 4 in order to maintain the vertical spring action of the hydraulic system and suppress rolling in the transversal direction of the forwarder.

Preferably, the diagonal hydraulic conduits 17, 18 include non-return throttle valves 21, 22, which restrain the flow of hydraulic fluid from hydraulic cylinder 2 to hydraulic cylinder 3 and from hydraulic cylinder 4 to hydraulic cylinder 1, respectively, something which increases the stability of the hydraulic system.

Figure 2:
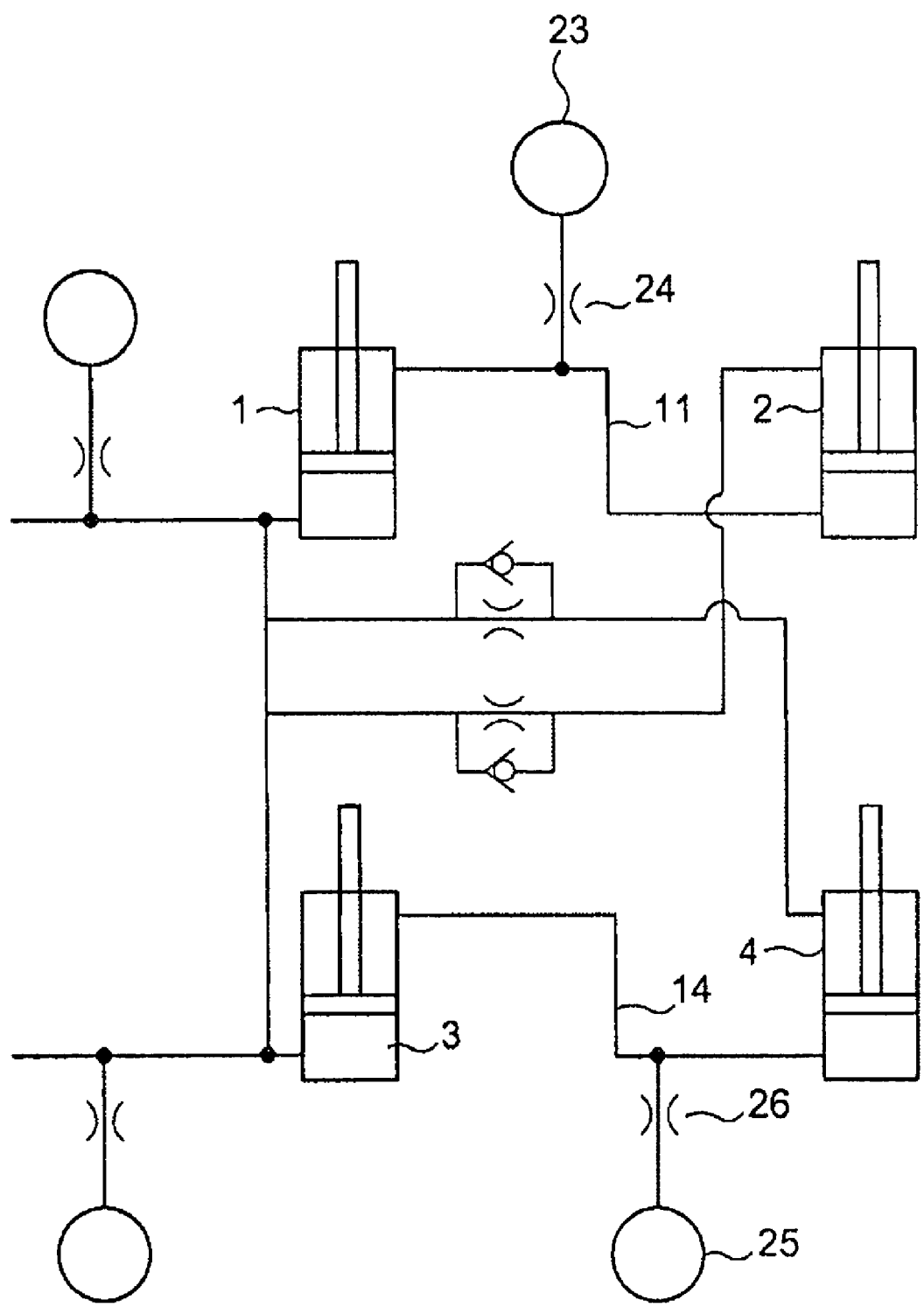
FIG. 2 is a schematic representation of a second embodiment of a hydraulic system according to the invention.

In spite of the fact that pitching in the longitudinal direction of the forwarder is a smaller problem than rolling in its transversal direction, since the forwarder is longer than it is wide, the hydraulic system preferably also includes members for suppressing pitching in the longitudinal direction of the forwarder. FIG. 2 illustrates such a hydraulic system. In addition to the components described in connection with FIG. 1, the hydraulic system includes a third storage tank 23, which via a throttle valve 24 is connected to the right-hand, series-connecting hydraulic conduit 11, as well as a fourth storage tank 25, which via a throttle valve 26 is connected to the left-hand, series-connecting hydraulic conduit 14. Preferably, the hydraulic fluid in the storage tanks 23 and 25 is pressurized so that the pressure therein exceeds the static pressure which is produced when driving in sloping terrain, whereby pitching in the longitudinal direction of the forwarder is suppressed while maintaining the stability of the hydraulic system in the longitudinal direction of the forwarder, i.e. without obtaining an excessive inclination of the operator's cabin in the longitudinal direction of the forwarder.

In the foregoing, the invention has been described starting from two different embodiments. It will be understood, however, that the principle of the invention can be applied to variants of these embodiments. The above-mentioned first and second storage tanks 12 and 15, for example, can be connected to the rear cylinders 2 and 4 instead of the front cylinders. Alternatively, the hydraulic cylinders on each side of the longitudinal axis of the vehicle can be connected to more than one storage tank. Furthermore, it will be understood that the principle of the invention encompasses embodiments where the structural part is suspended by three or more hydraulic cylinders connected in series and arranged on each side of the longitudinal axis of the vehicle.

Furthermore, it will be understood that other valve arrangements than those described above can be utilised without departing from the principle of the invention.

In the foregoing, structural parts in the form of the operator's cabin and the load-carrying member of the load-carrying vehicle have been mentioned. However, it will be understood that the invention also is applicable to other structural parts which are in need of cushioning. It also will be understood that the invention is applicable to other all-terrain vehicles than forwarders.

The invention claimed is:

1. A shock-absorbing hydraulic system for cushioning a structural part of an all-terrain load-carrying vehicle including a vehicle chassis, said hydraulic system including:
    a first, double-acting, hydraulic front cylinder and a first, double-acting, hydraulic rear cylinder, each exhibiting a first end and a second end, said first hydraulic cylinders being connected in series by means of a first, series connecting hydraulic conduit and being arranged on one side of the longitudinal axis of the load-carrying vehicle in a succession in the longitudinal direction of the load-carrying vehicle; and a second, double-acting, hydraulic front cylinder and a second, double-acting, hydraulic rear cylinder, each exhibiting a first end and a second end, said second hydraulic cylinders being connected in series by means of a second, series connecting hydraulic conduit and being arranged on the other side of the longitudinal axis of the load-carrying vehicle in a succession in the longitudinal direction of the load-carrying vehicle, said hydraulic cylinders being arranged between the structural part and the chassis of the load carrying vehicle, wherein the first end of the first, hydraulic front cylinder is connected to the second end of the second, hydraulic rear cylinder by means of a first, diagonal hydraulic conduit, and wherein the second end of the first, hydraulic rear cylinder is connected to the first end of the second, hydraulic front cylinder by means of a second diagonal hydraulic conduit.

2. Hydraulic system according to claim 1, wherein one of the first hydraulic cylinders is connected to at least a first storage tank, and wherein one of the second hydraulic cylinders is connected to at least a second storage tank.

3. Hydraulic system according to claim 2, wherein a third storage tank is connected to the first, series-connecting hydraulic conduit, and in that a fourth storage tank is connected to the second, series-connecting hydraulic conduit.

4. Hydraulic system according to claim 1, wherein each of the first and second diagonal hydraulic conduits includes a non-return throttle valve which restrains the flow of hydraulic fluid from the first, hydraulic rear cylinder to the second, hydraulic front cylinder and from the second, hydraulic rear cylinder to the first, hydraulic front cylinder, respectively.

5. Hydraulic system according to claim 1, wherein said structural part is an operator's cabin of the load-carrying vehicle.

6. Hydraulic system according to claim 1, wherein said structural part is a load carrying member of the load-carrying vehicle.

7. An all-terrain load-carrying vehicle including a shock-absorbing hydraulic system for cushioning a structural part of the load-carrying vehicle, said hydraulic system including:

a first, double-acting, hydraulic front cylinder and a first, double-acting, hydraulic rear cylinder, each exhibiting a first end and a second end, said first hydraulic cylinders being connected in series by means of a first, series connecting hydraulic conduit and being arranged on one side of the longitudinal axis of the load-carrying vehicle in a succession in the longitudinal direction of the load-carrying vehicle; and a second, double-acting, hydraulic front cylinder and a second, double-acting, hydraulic rear cylinder, each exhibiting a first end and a second end, said second hydraulic cylinders being connected in series by means of a second, series connecting hydraulic conduit and being arranged on the other side of the longitudinal axis of the load-carrying vehicle in a succession in the longitudinal direction of the load-carrying vehicle, said hydraulic cylinders being arranged between the structural part and a chassis of the load carrying vehicle, wherein the first end of the first, hydraulic front cylinder is connected to the second end of the second, hydraulic rear cylinder by means of a first, diagonal hydraulic conduit, and wherein the second end of the first, hydraulic rear cylinder is connected to the first end of the second, hydraulic front cylinder by means of a second, diagonal hydraulic conduit.

8. Load-carrying vehicle according to claim 7, wherein one of the first hydraulic cylinders is connected to at least a first storage tank, and wherein one of the second hydraulic cylinders is connected to at least a second storage tank.

9. Load-carrying vehicle according to claim 8, wherein a third storage tank is connected to the first, series-connecting hydraulic conduit, and wherein a fourth storage tank is connected to the second, series-connecting hydraulic conduit.

10. Load-carrying vehicle according to claim 7, wherein each of the first and second diagonal hydraulic conduits includes a non-return throttle valve which restrains the flow of hydraulic fluid from the first, hydraulic rear cylinder to the second, hydraulic front cylinder and from the second, hydraulic rear cylinder to the first, hydraulic front cylinder, respectively.

11. Load-carrying vehicle according to claim 7, wherein said structural part is an operator's cabin of the load-carrying vehicle.

12. Load-carrying vehicle according to claim 7, wherein said structural part is a load-carrying member of the load-carrying vehicle.

* * * * *